United States Patent
Ikai et al.

(10) Patent No.: US 10,133,249 B2
(45) Date of Patent: Nov. 20, 2018

(54) SERVOMOTOR CONTROLLER FOR REDUCING POWER PEAK

(71) Applicant: FANUC CORPORATION, Yamanashi (JP)

(72) Inventors: Satoshi Ikai, Yamanashi (JP); Kenichi Takayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/408,306

(22) Filed: Jan. 17, 2017

(65) Prior Publication Data

US 2017/0205786 A1 Jul. 20, 2017

(30) Foreign Application Priority Data

Jan. 18, 2016 (JP) .................. 2016-007177

(51) Int. Cl.
| | |
|---|---|
| G05B 11/32 | (2006.01) |
| G05B 15/02 | (2006.01) |
| G05B 19/414 | (2006.01) |
| H02P 5/74 | (2006.01) |
| H02M 5/458 | (2006.01) |
| H02M 1/00 | (2006.01) |

(52) U.S. Cl.
CPC .......... *G05B 15/02* (2013.01); *G05B 19/414* (2013.01); *H02P 5/74* (2013.01); *G05B 2219/34013* (2013.01); *G05B 2219/34445* (2013.01); *G05B 2219/41293* (2013.01); *G05B 2219/41294* (2013.01); *H02M 5/458* (2013.01); *H02M 2001/008* (2013.01)

(58) Field of Classification Search
USPC ........ 318/625, 769, 400.26, 803, 8, 34, 122, 318/400.17, 5
See application file for complete search history.

(56) References Cited

FOREIGN PATENT DOCUMENTS

| | | | | |
|---|---|---|---|---|
| JP | 10-283039 A | 10/1998 | | |
| JP | 2006060935 A | * | 3/2006 | ................ H02P 5/74 |
| JP | 2008-23599 A | 2/2008 | | |
| JP | 2009-136058 A | 6/2009 | | |
| JP | 2009-285666 A | 12/2009 | | |
| JP | 2010-221221 A | 10/2010 | | |
| JP | 2013-9524 A | 1/2013 | | |
| JP | 2014-96929 A | 5/2014 | | |

\* cited by examiner

*Primary Examiner* — Bentsu Ro
*Assistant Examiner* — Iftekhar Mustafa
(74) *Attorney, Agent, or Firm* — Hauptman Ham, LLP

(57) ABSTRACT

A servomotor controller includes a first and a second converter circuit that perform conversion between AC power of a power supply and DC power, a first inverter circuit that performs conversion between the DC power on the DC side of the first converter circuit and AC power on the side of a first motor, a second inverter circuit that performs conversion between the DC power on the DC side of the second converter circuit and AC power on the side of a second motor, and a power calculation unit that calculates an amount of power of the first motor, wherein control is performed so that the regenerative power of the first motor is supplied to the second motor through the power supply or the regenerative power of the second motor is supplied to the first motor through the power supply, on the basis of the amount of power.

7 Claims, 7 Drawing Sheets

SERVOMOTOR CONTROLLER FOR REDUCING POWER PEAK

RELATED APPLICATIONS

The present application claims priority to Japanese Patent Application Number 2016-007177 filed Jan. 18, 2016, the disclosure of which is hereby incorporated by reference herein in its entirety.

BACKGROUND OF THE INVENTION

1. Field of the Invention

The present invention relates to a servomotor controller for controlling a servomotor that uses as drive power, AC power obtained by converting AC power on the side of an AC power supply into DC power and further converting the DC power into AC power.

2. Description of the Related Art

In a servomotor controller for driving and controlling a servomotor in a machine tool, an industrial machine, a forging press, an injection molding machine, or each of various robots, AC power on the side of an AC power supply is temporarily converted into DC power, the DC power is further converted into AC power, and the AC power is used as drive power for a servomotor (to be referred to as a "drive axis servomotor" hereinafter) provided for each drive axis. Each drive axis in, for example, a machine tool is connected to a drive axis servomotor. The servomotor controller includes a converter circuit that converts AC power supplied from the side of an AC power supply serving as a commercial three-phase AC power supply into DC power and outputs the DC power, and an inverter circuit that is connected to a DC link on the DC side of the converter circuit and performs power conversion between DC power in the DC link and AC power serving as the drive power or regenerative power of a motor, and the servomotor controller controls the velocity, torque, or rotor position of a servomotor connected to the AC side of the inverter circuit.

Upon acceleration or deceleration control of the motor by the servomotor controller, a power peak occurs because the output or regeneration of high AC power may be preferably performed in the AC power supply. Under the circumstances, it is a common practice to design a power supply equipment capacity on the side of an AC power supply that supplies power to the servomotor controller, in consideration of the power peak occurring upon acceleration or deceleration of the motor. However, in design that takes into consideration the power peak occurring upon acceleration or deceleration of the servomotor, the power peak is inevitably high compared to those in design in which the average power of the servomotor controller is simply taken into consideration. Especially in a servomotor controller that is more likely to rapidly accelerate or decelerate a servomotor, the power peak is accordingly higher. Since the higher the power peak, the higher the installation and operation costs, the power peak is desirably reduced.

To reduce the power peak, a method for providing an energy storage device that may store DC power in a DC link connecting a converter circuit and an inverter circuit of a servomotor controller to each other to appropriately exchange energy consumed or regenerated in each servomotor via the DC link has been conventionally employed. With this method, appropriate control of each amount of power conversion in a powering operation (conversion operation) for converting AC power into DC power and a power regeneration operation (inversion operation) for converting DC power into AC power by the inverter circuit can store in the energy storage device, regenerative power generated by the servomotor in deceleration of the servomotor, and reuse the stored power in acceleration of the servomotor, so that the power peak can be reduced.

FIG. 7 is a block diagram illustrating an exemplary conventional servomotor controller including buffer axis servomotors of a single-winding type as an energy storage device to reduce the power peak. A servomotor controller 1000 that drives two drive axis servomotors 2A-1 and 2A-2 will be described below as an example.

A servomotor normally includes at least one winding and one inverter circuit may be preferably provided per winding in a servomotor to drive the servomotor. FIG. 7 illustrates each of servomotors 2A-1, 2A-2, 2B-1, and 2B-2 as the single-winding type as an example. An inverter circuit 112-1 is provided to supply drive power to the drive axis servomotor 2A-1 to drive and control the drive axis servomotor 2A-1, and an inverter circuit 112-2 is provided to supply drive power to the drive axis servomotor 2A-2 to drive and control the drive axis servomotor 2A-2.

Converter circuits (reference numerals 111-1 and 111-2) are provided in correspondence with the inverter circuits 112-1 and 112-2 in the example illustrated in FIG. 7, but only one converter circuit may be provided for a plurality of inverter circuits in order to keep the cost and occupied space of the servomotor controller 1000 less. The converter circuit 111-1 converts AC power supplied from an AC power supply 3 and outputs DC power, and the inverter circuit 112-1 converts the DC power output from the converter circuit 111-1 into AC power to be supplied as drive power for the drive axis servomotor 2A-1 and converts AC power regenerated from the drive axis servomotor 2A-1 into DC power. The converter circuit 111-2 converts AC power supplied from the AC power supply 3 and outputs DC power, and the inverter circuit 112-2 converts the DC power output from the converter circuit 111-2 into AC power to be supplied as drive power for the drive axis servomotor 2A-2 and converts AC power regenerated from the drive axis servomotor 2A-2 into DC power.

To reduce the power peak, an energy storage device 120 that can store or supply DC power is provided to a DC link connecting the converter circuit 111-1 and the inverter circuit 112-1 to each other and a DC link connecting the converter circuit 111-2 and the inverter circuit 112-2 to each other. FIG. 7 illustrates as an example, an energy storage device 120 including servomotors (to be referred to as "buffer axis servomotors" hereinafter for the sake of distinction from drive axis servomotors) 2B-1 and 2B-2 and inverter circuits 112-3 and 112-4 provided in correspondence with the respective buffer axis servomotors. In other words, the DC link connecting the converter circuit 111-1 and the inverter circuit 112-1 to each other is provided with an inverter circuit 112-3 for mutual conversion between electrical energy in the DC link and rotational energy of the buffer axis servomotor 2B-1, and the DC link connecting the converter circuit 111-2 and the inverter circuit 112-2 to each other is provided with an inverter circuit 112-4 for mutual conversion between electrical energy in the DC link and rotational energy of the buffer axis servomotor 2B-2.

When, for example, the drive axis servomotor 2A-1 decelerates, regenerative power occurs, and the DC link voltage between the converter circuit 111-1 and the inverter circuit 112-1 rises, the DC power in the DC link is converted by the inverter circuit 112-3 into AC power, which is used as power to accelerate the buffer axis servomotor 2B-1. With this operation, electrical energy in the DC link can be stored as rotational energy of the buffer axis servomotor 2B-1. Further, when, for example, the drive axis servomotor 2A-1 accelerates and the DC link voltage between the converter circuit 111-1 and the inverter circuit 112-1 drops, decelerating the buffer axis servomotor 2B-1 produces AC regenerative power, which is converted into DC power by the inverter circuit 112-3. Even when the DC link voltage between the converter circuit 111-2 and the inverter circuit 112-2 rises or drops upon acceleration or deceleration of the drive axis servomotor 2A-2, the inverter circuit 112-4 is similarly operated, so that energy can be stored in the buffer axis servomotor 2B-2 or energy can be supplied from the buffer axis servomotor 2B-2 to the DC link. Respective electrical energies obtained by conversion from the rotational energies of the buffer axis servomotors 2B-1 and 2B-2 can be reused in acceleration of the drive axis servomotors 2A-1 and 2A-2, respectively, to reduce the power peak in the entire servomotor controller 1000.

FIG. 8 is a block diagram illustrating an exemplary conventional servomotor controller for driving a plurality of axes, including buffer axis servomotors of a plural-winding type as an energy storage device to reduce the power peak. The example illustrated in FIG. 8 assumes that a servomotor controller 1001 includes four drive axis servomotors 2A-1, 2A-2, 2A-3, and 2A-4, the drive axis servomotors 2A-1 and 2A-2 are used to drive a first drive axis (not illustrated), and the drive axis servomotors 2A-3 and 2A-4 are used to drive a second drive axis (not illustrated), independently of the first drive axis. The drive axis servomotors 2A-1, 2A-2, 2A-3, and 2A-4 are provided with a pair of a converter circuit 111-1 and an inverter circuit 112-1, a pair of a converter circuit 111-2 and an inverter circuit 112-2, a pair of a converter circuit 111-3 and an inverter circuit 112-5, and a pair of a converter circuit 111-4 and an inverter circuit 112-6, respectively. Since the first drive axis and the second drive axis are independently driven, an energy storage device (denoted by reference numerals 121 and 122) is provided in correspondence with each drive axis. When buffer axis servomotors for each of the energy storage devices 121 and 122 are implemented as a single unit, buffer axis servomotors of the two-winding type (denoted by reference numerals 2B-3 and 2B-4) are used, as illustrated in FIG. 8. Inverter circuits 112-3, 112-4, 112-7, and 112-8 are provided in correspondence with the buffer axis servomotors 2B-3 and 2B-4 of the two-winding type. Electrical energy obtained by conversion from the rotational energy of the buffer axis servomotor 2B-3 can be reused in acceleration of the drive axis servomotors 2A-1 and 2A-2, and electrical energy obtained by conversion from the rotational energy of the buffer axis servomotor 2B-4 can be reused in acceleration of the drive axis servomotors 2A-3 and 2A-4 to reduce the power peak in the entire servomotor controller 1001.

A servo press is available which is supplied with power from a flywheel storage device in accordance with the power requirement to avoid an excessive power supply peak requirement, as disclosed in, for example, Japanese Unexamined Patent Publication (Kokai) No. 2008-23599.

A motor drive device is also available which includes both a capacitor storage unit and a flywheel storage unit as an energy storage device and stores or supplies energy using the capacitor storage unit, the flywheel storage unit, or both of them as appropriate, as disclosed in, for example, Japanese Unexamined Patent Publication (Kokai) No. 2013-9524.

Another servo press is available which includes a power supply circuit capable of mutual regenerative power supply between a main motor amplifier and a conveyor motor amplifier, as disclosed in, for example, Japanese Unexamined Patent Publication (Kokai) No. 2009-285666.

Further, in a press facility, a configuration is available which connects a servo press power converter and a machine press power converter to an AC link, generates regenerative power using a machine press and supplies it to a servo press when the servo press involves high power, as disclosed in, for example, Japanese Unexamined Patent Publication (Kokai) No. 2010-221221.

A motor drive device is known which uses a secondary battery, a large-capacity power capacitor, an electric double-layer capacitor, or the like as an energy storage device, as disclosed in, for example, Japanese Unexamined Patent Publication (Kokai) No. 2009-136058.

In the conventional method for reducing the power peak by appropriately exchanging energy consumed or regenerated in each of the above-mentioned servomotors via the buffer axis servomotors provided to the DC links, a buffer axis servomotor and an inverter circuit therefor may be preferably provided in correspondence with a pair of a converter circuit and an inverter circuit for a drive axis servomotor. Therefore, when a plurality of drive axis servomotors are present, a plurality of pairs of buffer axis servomotors of the single-winding type and inverter circuits therefor may be preferably provided in correspondence with the number of drive axis servomotors, or a pair of a buffer axis servomotor of the plural-winding type including windings corresponding in number to drive axis servomotors and an inverter circuit therefor may be preferably provided.

When a buffer axis servomotor of the single-winding type is provided as illustrated in, for example, FIG. 7, a buffer axis servomotor 2B-1 and an inverter circuit 112-3 may be preferably provided to a pair of a converter circuit 111-1 and an inverter circuit 112-1 for a drive axis servomotor 2A-1, and a buffer axis servomotor 2B-2 and an inverter circuit 112-4 may be preferably provided to a pair of a converter circuit 111-2 and an inverter circuit 112-2 for a drive axis servomotor 2A-2. This poses a problem that the number of pairs of buffer axis servomotors of the single-winding type and inverter circuits therefor increases, thus inevitably involving a higher cost and larger device.

When a first drive axis and a second drive axis are driven as illustrated in, for example, FIG. 8, an energy storage device 121 and 122 is provided in correspondence with each drive axis to reduce the power peak. Since the buffer axis servomotors 2B-3 and 2B-4 of the energy storage devices 121 and 122, respectively, independently accelerate or decelerate in accordance with the drive states of the first drive axis and the second drive axis, the power peak can be reduced in the servomotor controller 1001 as a whole. However, since an energy storage device may be preferably provided for each drive axis, a problem is posed that the number of energy storage devices increases, thus inevitably involving a higher cost and larger device.

In this manner, the conventional method poses a problem that an attempt to reduce the power peak inevitably involves a higher cost and larger device.

SUMMARY OF THE INVENTION

In view of the problem as described above, it is an object of the invention to provide a servomotor controller for controlling a servomotor that uses as drive power, AC power obtained by converting AC power on the side of an AC power supply into DC power and further converting the DC power into AC power, as a compact, low-cost servomotor controller that can reduce the power peak.

In order to achieve the above-described object, a servomotor controller includes at least one first converter circuit that performs power conversion between AC power on a side of an AC power supply and DC power on a DC side, at least one first inverter circuit that performs power conversion between the DC power on the DC side of the first converter circuit and one of AC power supplied to a first servomotor and AC power regenerated from the first servomotor, at least one second converter circuit that performs power conversion between the AC power on the side of the AC power supply and DC power on a DC side, at least one second inverter circuit that performs power conversion between the DC power on the DC side of the second converter circuit and one of AC power supplied to a second servomotor and AC power regenerated from the second servomotor, and a power calculation unit that calculates an amount of power consumed or regenerated in the first servomotor, wherein the power conversion by the second converter circuit and the second inverter circuit is controlled so that the power regenerated from the first servomotor is supplied to the second servomotor through the AC power supply or the power regenerated from the second servomotor is supplied to the first servomotor through the AC power supply, on the basis of the amount of power calculated by the power calculation unit.

The servomotor controller may further include a control unit that controls the power conversion by the first converter circuit, the first inverter circuit, the second converter circuit, and the second inverter circuit and includes the power calculation unit.

The servomotor controller may further include a first control unit that controls the power conversion by the first converter circuit and the first inverter circuit and includes the power calculation unit, a second control unit that is provided independently of the first control unit and controls the power conversion by the second converter circuit and the second inverter circuit, and a communication unit that sends the amount of power calculated by the power calculation unit to the second control unit, wherein the second control unit may control the power conversion by the second converter circuit and the second inverter circuit, on the basis of the amount of power calculated by the power calculation unit and received via the communication unit.

The power conversion by the second converter circuit and the second inverter circuit may be controlled on the basis of a sum of amounts of power calculated respectively for a plurality of first servomotors by the power calculation unit.

The power calculation unit may calculate an amount of power consumed or regenerated in the first servomotor, on the basis of an actual velocity of the first servomotor and a torque command used in the power conversion by the first inverter circuit to drive the first servomotor.

The power conversion by the second converter circuit and the second inverter circuit may be controlled on the basis of a difference between the amount of power calculated by the power calculation unit and predetermined thresholds.

The servomotor controller may further include a determination unit that determines whether the first servomotor is in a power-regenerated state or a power-consumed state on the basis of the amount of power calculated by the power calculation unit and that determines whether an absolute value of the amount of power calculated by the power calculation unit falls within the predetermined thresholds, a velocity command unit that sets a velocity command used in the power conversion by the second inverter circuit to drive the second servomotor to a value larger than a velocity command in a steady state when it is determined by the determination unit that the power-regenerated state has been set and that the absolute value of the amount of power calculated by the power calculation unit has exceeded a first threshold of the predetermined thresholds, and that sets a velocity command used in the power conversion by the second inverter circuit to drive the second servomotor to a value smaller than a velocity command in a steady state when it is determined by the determination unit that the power-consumed state has been set and that the absolute value of the amount of power calculated by the power calculation unit has exceeded a second threshold of the predetermined thresholds, and a torque limit value calculation unit that calculates a torque limit value for a torque command used in the power conversion by the second inverter circuit to drive the second servomotor, on the basis of the difference between the amount of power calculated by the power calculation unit and the predetermined thresholds, and the actual velocity of the first servomotor, wherein the power conversion by the second inverter circuit may be controlled on the basis of the torque limit value calculated by the torque limit value calculation unit and the velocity command set by the velocity command unit.

BRIEF DESCRIPTION OF THE DRAWINGS

The present invention will be understood more clearly by referring to the following accompanying drawings.

DETAILED DESCRIPTION

A servomotor controller for reducing the power peak will be described below with reference to the drawings. It should be understood that the invention is not limited to the drawings or embodiments described below.

Figure 1:
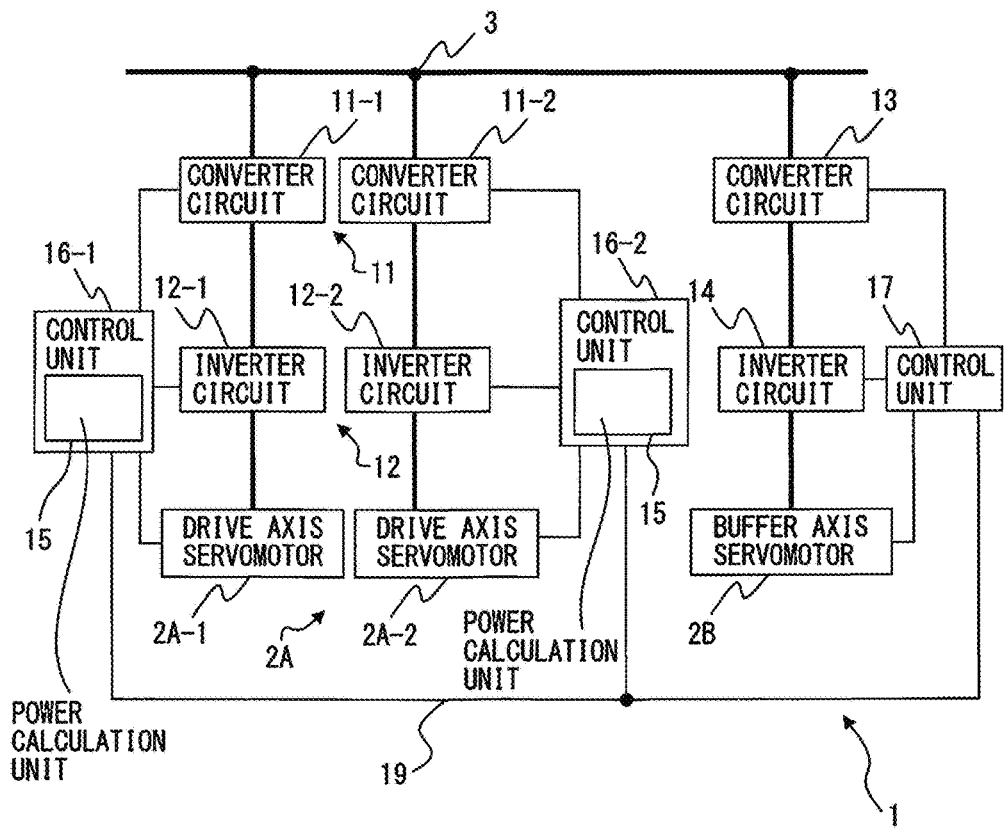
FIG. 1 is a block diagram illustrating a servomotor controller according to an embodiment.

FIG. 1 is a block diagram illustrating a servomotor controller according to an embodiment. The same reference numerals in different drawings denote hereinafter components having the same functions. In general, a servomotor includes at least one winding and one inverter circuit may be preferably provided per winding to drive the servomotor. A plurality of inverter circuits are connectable to one converter circuit. In the present invention, it suffices to use at least one drive axis servomotor and at least one buffer axis servomotor, but the following embodiment assumes an example in which servomotors of a single-winding type are used such that two drive axis servomotors (denoted by reference numerals 2A-1 and 2A-2) serving as first servomotors are used, and one buffer axis servomotor (denoted by reference numeral 2B) serving as a second servomotor is used. A first converter circuit 11 and a first inverter circuit 12 (to be described later) are provided for each drive axes servomotor 2A, and a second converter circuit 13 and a second inverter circuit 14 (to be described later) are provided for each buffer axis servomotor 2B.

Power conversion by the second converter circuit 13 and the second inverter circuit 14 for the buffer axis servomotor 2B is controlled so that power regenerated from each of the drive axis servomotors 2A-1 and 2A-2 is supplied to the buffer axis servomotor 2B through an AC power supply 3 or power regenerated from the buffer axis servomotor 2B is supplied to each of the drive axis servomotors 2A-1 and 2A-2 through the AC power supply 3, on the basis of the amount of power of the drive axis servomotor 2A (denoted more specifically by reference numerals 2A-1 and 2A-2). Therefore, a servomotor controller 1 according to the embodiment includes the first converter circuit 11 (denoted more specifically by reference numerals 11-1 and 11-2) that performs power conversion between AC power on the side of an AC power supply 3 and DC power on the DC side, the first inverter circuit 12 (denoted more specifically by reference numerals 12-1 and 12-2) that performs power conversion between the DC power on the DC side of each of the first converter circuits 11-1 and 11-2 and AC power supplied to each of the drive axis servomotors 2A-1 and 2A-2 or AC power regenerated from each of the drive axis servomotors 2A-1 and 2A-2, the second converter circuit 13 that performs power conversion between the AC power on the side of the AC power supply 3 and the DC power on the DC side, the second inverter circuit 14 that performs power conversion between the DC power on the DC side of the second converter circuit 13 and AC power supplied to the buffer axis servomotor 2B or AC power regenerated from the buffer axis servomotor 2B, and a power calculation unit 15 that calculates an amount of power consumed or regenerated in each of the drive axis servomotors 2A-1 and 2A-2.

It suffices that each converter circuit and each inverter circuit perform mutual power conversion between DC power in the DC link and AC power serving as the drive power or regenerative power of the servomotor, and a PWM control power conversion circuit including a semiconductor switching element and a bridge circuit of a diode connected in inverse parallel to the semiconductor switching element, for example, is available. Examples of the semiconductor switching element may include an IGBT, a thyristor, a GTO (Gate Turn-OFF thyristor), and a transistor, but the type of semiconductor switching element itself is not intended to limit the present invention and other types of semiconductor switching elements may be used.

As described above, the power calculation unit 15 calculates amounts of power consumed or regenerated in the drive axis servomotors 2A-1 and 2A-2. More specifically, the power calculation unit 15 calculates an amount of power consumed or regenerated in the drive axis servomotor 2A, on the basis of the actual velocity of the drive axis servomotor 2A and the torque command used in power conversion by the first inverter circuit 12 to drive the drive axis servomotor 2A. The actual velocity of the drive axis servomotor 2A is detected by a velocity detection unit (not illustrated) mounted in the drive axis servomotor 2A. An amount of power P of the drive axis servomotor 2A is given by:

$$P = T_{com} \times v_{2A} \times \frac{2\pi}{60} \quad (1)$$

where $v_{2A}$ is the actual velocity of the drive axis servomotor 2A and $T_{com}$ is the torque command used in the power conversion by the first inverter circuit 12 to drive the drive axis servomotor 2A.

As presented in equation (1), the amount of power P of the drive axis servomotor 2A calculated using the torque command instead of the feedback of an actual torque means is not the past amount of power but the amount of power expected in the near future. The amount of power P of the drive axis servomotor 2A is calculated in accordance with equation (1) and used in controlling the power supply operation and power storage operation of a buffer axis servomotor to enhance the response characteristics of the buffer axis servomotor.

When a single drive axis servomotor 2A is provided, power conversion by the second converter circuit 13 and the second inverter circuit 14 (to be described later) is controlled by a second control unit 17 on the basis of the amount of power of the single drive axis servomotor 2A calculated by the power calculation unit 15. When a plurality of drive axis servomotors 2A are provided, since the drive axis servomotors 2A perform different operations on the same time axis, an amount of power for each individual drive axis servomotor 2A is calculated by the power calculation unit 15 first, and then the power conversion by the second converter circuit 13 and the second inverter circuit 14 (to be described later) is controlled by the second control unit 17 on the basis of the sum of obtained amounts of power. This sum of amounts of power is obtained in the second control unit 17 by, for example, receiving via a communication unit 19, the amount of power for each individual drive axis servomotor 2A calculated by the power calculation unit 15 and summing the received amounts of power.

Alternatively, a sum calculation unit (not illustrated) that calculates a sum of amounts of power for the respective drive axis servomotors 2A individually calculated by the power calculation unit 15 mounted in each of first control units 16-1 and 16-2 may be separately provided and information concerning the sum of amounts of power calculated by the sum calculation unit may be sent to the second control unit 17 via the communication unit 19. In the example illustrated in FIG. 1, since two drive axis servomotors are provided, the power calculation unit 15 sets the amount of power of the drive axis servomotor 2A as the sum of amounts of power calculated respectively for the drive axis servomotors 2A-1 and 2A-2, and the second control unit 17 controls the power conversion by the second converter circuit 13 and the second inverter circuit 14 on the basis of the sum of amounts of power calculated respectively for the drive axis servomotors 2A-1 and 2A-2.

The servomotor controller 1 includes first control units 16-1 and 16-2 for the drive axis servomotors 2A-1 and 2A-2, the second control unit 17 for the buffer axis servomotor 2B, and the communication unit 19.

The first control unit 16-1 controls the power conversion operations of the first converter circuit 11-1 and the first inverter circuit 12-1, and the first control unit 16-2 controls the power conversion operations of the first converter circuit 11-2 and the first inverter circuit 12-2. Each of the first control units 16-1 and 16-2 includes the power calculation unit 15. In the example illustrated in FIG. 1, since two drive axis servomotors are used, the power calculation unit 15 calculates an amount of power of the drive axis servomotor 2A as the sum of amounts of power calculated respectively for the drive axis servomotors 2A-1 and 2A-2.

The communication unit 19 sends the amount of power calculated by the power calculation unit 15 to the second control unit 17. Note that it suffices to implement the communication unit 19 using a known wired communication system or wireless communication system.

In the present embodiment, the second control unit 17 for the buffer axis servomotor 2B is provided independently of the first control units 16-1 and 16-2 for the drive axis servomotors 2A-1 and 2A-2. The second control unit 17 controls power conversion by the second converter circuit 13 and the second inverter circuit 14 on the basis of the above-mentioned amount of power (i.e., the sum of the amount of power of the drive axis servomotor 2A-1 and the amount of power of the drive axis servomotor 2A-2) calculated by the power calculation unit 15 so that power regenerated from each of the drive axis servomotors 2A-1 and 2A-2 is supplied to the buffer axis servomotor 2B through an AC power supply 3 or power regenerated from the buffer axis servomotor 2B is supplied to each of the drive axis servomotors 2A-1 and 2A-2 through the AC power supply 3.

Power conversion by the second converter circuit 13 and the second inverter circuit 14 is controlled on the basis of the difference between the amount of power calculated by the power calculation unit 15 and predetermined thresholds. This operation will be described in detail below with reference to FIG. 2.

Figure 2:
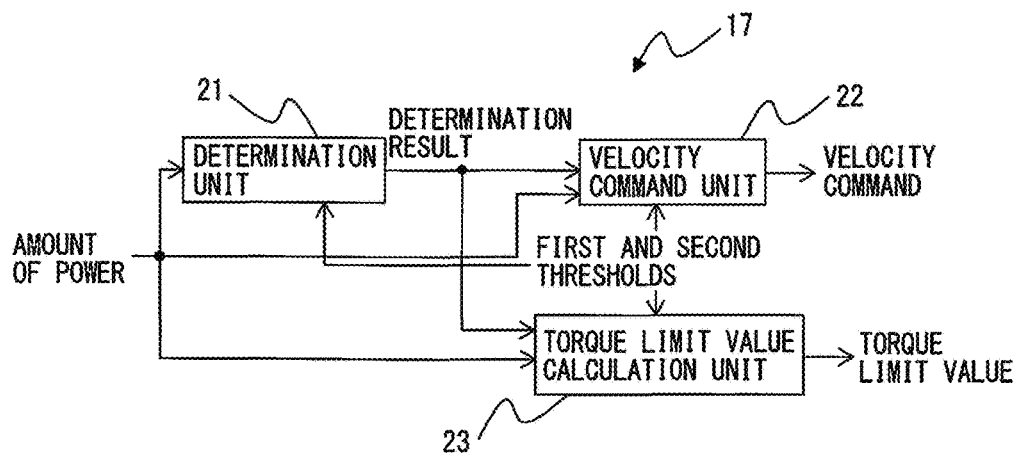
FIG. 2 is a block diagram illustrating a second control unit in the servomotor controller according to the embodiment.

FIG. 2 is a block diagram illustrating a second control unit in the servomotor controller according to the embodiment. The second control unit 17 includes a determination unit 21, a velocity command unit 22, and a torque limit value calculation unit 23.

The determination unit 21 determines whether the drive axis servomotor 2A is in a power-regenerated state or a power-consumed state on the basis of the amount of power calculated by the power calculation unit 15 and determines whether the absolute value of the amount of power calculated by the power calculation unit 15 falls within the predetermined thresholds. When a single drive axis servomotor 2A is provided, the determination unit 21 determines whether the drive axis servomotor 2A is in a power-regenerated state or a power-consumed state on the basis of the amount of power of the single drive axis servomotor 2A and determines whether the absolute value of the amount of power of the single drive axis servomotor 2A falls within the predetermined thresholds. When a plurality of drive axis servomotors 2A are provided, the determination unit 21 determines whether the drive axis servomotors 2A are, as a whole, in a power-regenerated state or a power-consumed state on the basis of the sum of amounts of power calculated respectively for the plurality of drive axis servomotors 2A and determines whether the absolute value of the sum of amounts of power calculated respectively for the plurality of drive axis servomotors 2A falls within the predetermined thresholds. As described above, the amount of power P of the drive axis servomotor 2A is expressed as equation (1), and the determination unit 21 determines that the drive axis servomotor 2A is in a power-regenerated state when the amount of power P is positive and determines that the drive axis servomotor 2A is in a power-consumed state when the amount of power P is negative.

The velocity command unit 22 sets the velocity command used in power conversion by the second inverter circuit 14 to drive the buffer axis servomotor 2B to a value larger than the velocity command in a steady state when it is determined by the determination unit 21 that the power-regenerated state has been set and that the absolute value of the amount of power (the sum of amounts of power when a plurality of drive axis servomotors 2A are provided) calculated by the power calculation unit 15 has exceeded a first threshold of the predetermined thresholds. The velocity command unit 22 further sets the velocity command used in the power conversion by the second inverter circuit 14 to drive the buffer axis servomotor 2B to a value smaller than the velocity command in a steady state when it is determined by the determination unit 21 that the power-consumed state has been set and that the absolute value of the amount of power (the sum of amounts of power when a plurality of drive axis servomotors 2A are provided) calculated by the power calculation unit 15 has exceeded a second threshold of the predetermined thresholds. Both the velocity command higher than that in a steady state set when the power-regenerated state has been set and the velocity command lower than that in a steady state set when the power-consumed state has been set are set as fixed values. The "steady state" herein means that the absolute value of the amount of power (the sum of amounts of power when a plurality of drive axis servomotors 2A are provided) calculated by the power calculation unit 15 while the drive axis servomotor 2A is in the power-regenerated state does not exceed the first threshold, and that the absolute value of the amount of power (the sum of amounts of power when a plurality of drive axis servomotors 2A are provided) calculated by the power calculation unit 15 while the drive axis servomotor 2A is in the power-consumed state does not exceed the second threshold. As an example of the velocity commands to be set, assuming that the velocity command for the buffer axis servomotor 2B in a steady state is 2,000 rpm, the velocity command for the buffer axis servomotor 2B when the absolute value of the amount of power (the sum of amounts of power when a plurality of drive axis servomotors 2A are provided) while the drive axis servomotor 2A is in the power-regenerated state has exceeded the first threshold is set to a maximum allowable velocity command (e.g., 3,000 rpm) for the buffer axis servomotor 2B, and the velocity command for the buffer axis servomotor 2B when the absolute value of the amount of power (the sum of amounts of power when a plurality of drive axis servomotors 2A are provided) while the drive axis servomotor 2A is in the power-consumed state has exceeded the second threshold is set to 500 rpm. Note that the first threshold for the power-regenerated state and the second threshold for the power-consumed state may be set, for example, to equal values or different values. In addition, the velocity commands, the first threshold and the second threshold may be set in advance in accordance with, e.g., the conditions and environments under which the servomotor controller 1 is operated.

The torque limit value calculation unit 23 calculates a torque limit value for the torque command used in the power conversion by the second inverter circuit 14 to drive the buffer axis servomotor 2B, on the basis of the difference between the amount of power (the sum of amounts of power when a plurality of drive axis servomotors 2A are provided) calculated by the power calculation unit 15 and the above-mentioned predetermined thresholds (first threshold or second threshold), and the actual velocity of the buffer axis servomotor 2B, when the absolute value of the amount of power (the sum of amounts of power when a plurality of drive axis servomotors 2A are provided) calculated by the power calculation unit 15 while the drive axis servomotor 2A is in the power-regenerated state has exceeded the first threshold, or when the absolute value of the amount of power (the sum of amounts of power when a plurality of drive axis servomotors 2A are provided) calculated by the power calculation unit 15 while the drive axis servomotor 2A is in the power-consumed state has exceeded the second threshold. The actual velocity of the buffer axis servomotor 2B is detected by a velocity detection unit (not illustrated) mounted in the buffer axis servomotor 2B. A torque limit value $T_{lim}$ used in the power conversion by the second inverter circuit 14 to drive the buffer axis servomotor 2B is given by:

$$T_{lim} = \frac{\Delta P}{v_{2B}} \times \frac{60}{2\pi} \quad (2)$$

where $v_{2B}$ is the actual velocity of the buffer axis servomotor 2B and $\Delta P$ is the difference between the amount of power (the sum of amounts of power when a plurality of drive axis servomotors 2A are provided) calculated by the power calculation unit 15 and the above-mentioned predetermined thresholds.

When the absolute value of the amount of power (the sum of amounts of power when a plurality of drive axis servomotors 2A are provided) calculated by the power calculation unit 15 while the drive axis servomotor 2A is in the power-regenerated state has exceeded the first threshold, and when the absolute value of the amount of power (the sum of amounts of power when a plurality of drive axis servomotors 2A are provided) calculated by the power calculation unit 15 while the drive axis servomotor 2A is in the power-consumed state has exceeded the second threshold, the torque limit value $T_{lim}$ is used in the power conversion operation of the second inverter circuit 14 to drive the buffer axis servomotor 2B, in place of the normal torque command. On the other hand, when the absolute value of the amount of power (the sum of amounts of power when a plurality of drive axis servomotors 2A are provided) calculated by the power calculation unit 15 in a steady state, i.e., while the drive axis servomotor 2A is in the power-regenerated state does not exceed the first threshold, and when the absolute value of the amount of power (the sum of amounts of power when a plurality of drive axis servomotors 2A are provided) calculated by the power calculation unit 15 while the drive axis servomotor 2A is in the power-consumed state does not exceed the second threshold, the normal torque command is used to perform the power conversion by the second inverter circuit 14 to drive the buffer axis servomotor 2B.

When the absolute value of the amount of power (the sum of amounts of power when a plurality of drive axis servomotors 2A are provided) calculated by the power calculation unit 15 while the drive axis servomotor 2A is in the power-regenerated state has exceeded the first threshold, or when the absolute value of the amount of power (the sum of amounts of power when a plurality of drive axis servomotors 2A are provided) calculated by the power calculation unit 15 while the drive axis servomotor 2A is in the power-consumed state has exceeded the second threshold, the power conversion operation of the second inverter circuit 14 is controlled on the basis of the above-mentioned torque limit value calculated by the torque limit value calculation unit 23 and the velocity command set by the velocity command unit 22. Details are as follows:

When the absolute value of the amount of power (the sum of amounts of power when a plurality of drive axis servomotors 2A are provided) calculated by the power calculation unit 15 while the drive axis servomotor 2A is in the power-regenerated state has exceeded the first threshold, the power conversion operation of the second inverter circuit 14 is controlled on the basis of the velocity command set to a value larger than the velocity command in a steady state, and the torque limit value $T_{lim}$ calculated by the torque limit value calculation unit 23. A change from the velocity command in a steady state to a higher velocity command is made stepwise, so that a higher AC power is supplied from the second inverter circuit 14 to the buffer axis servomotor 2B, which then accelerates. When the absolute value of the amount of power (the sum of amounts of power when a plurality of drive axis servomotors 2A are provided) calculated by the power calculation unit 15 while the drive axis servomotor 2A is in the power-regenerated state has exceeded the first threshold, power regenerated from the drive axis servomotor 2A is supplied in this way to the buffer axis servomotor 2B through the AC power supply 3.

When the absolute value of the amount of power (the sum of amounts of power when a plurality of drive axis servomotors 2A are provided) calculated by the power calculation unit 15 while the drive axis servomotor 2A is in the power-consumed state has exceeded the second threshold, the power conversion operation of the second inverter circuit 14 is controlled on the basis of the velocity command set to a value smaller than the velocity command in a steady state, and the torque limit value $T_{lim}$ calculated by the torque limit value calculation unit 23, and the buffer axis servomotor 2B then decelerates. A change from the velocity command in a steady state to a lower velocity command is made stepwise. When the absolute value of the amount of power (the sum of amounts of power when a plurality of drive axis servomotors 2A are provided) calculated by the power calculation unit 15 while the drive axis servomotor 2A is in the power-consumed state has exceeded the second threshold, power regenerated from the buffer axis servomotor 2B in this way is supplied to the drive axis servomotor 2A through the AC power supply 3.

Figure 3:
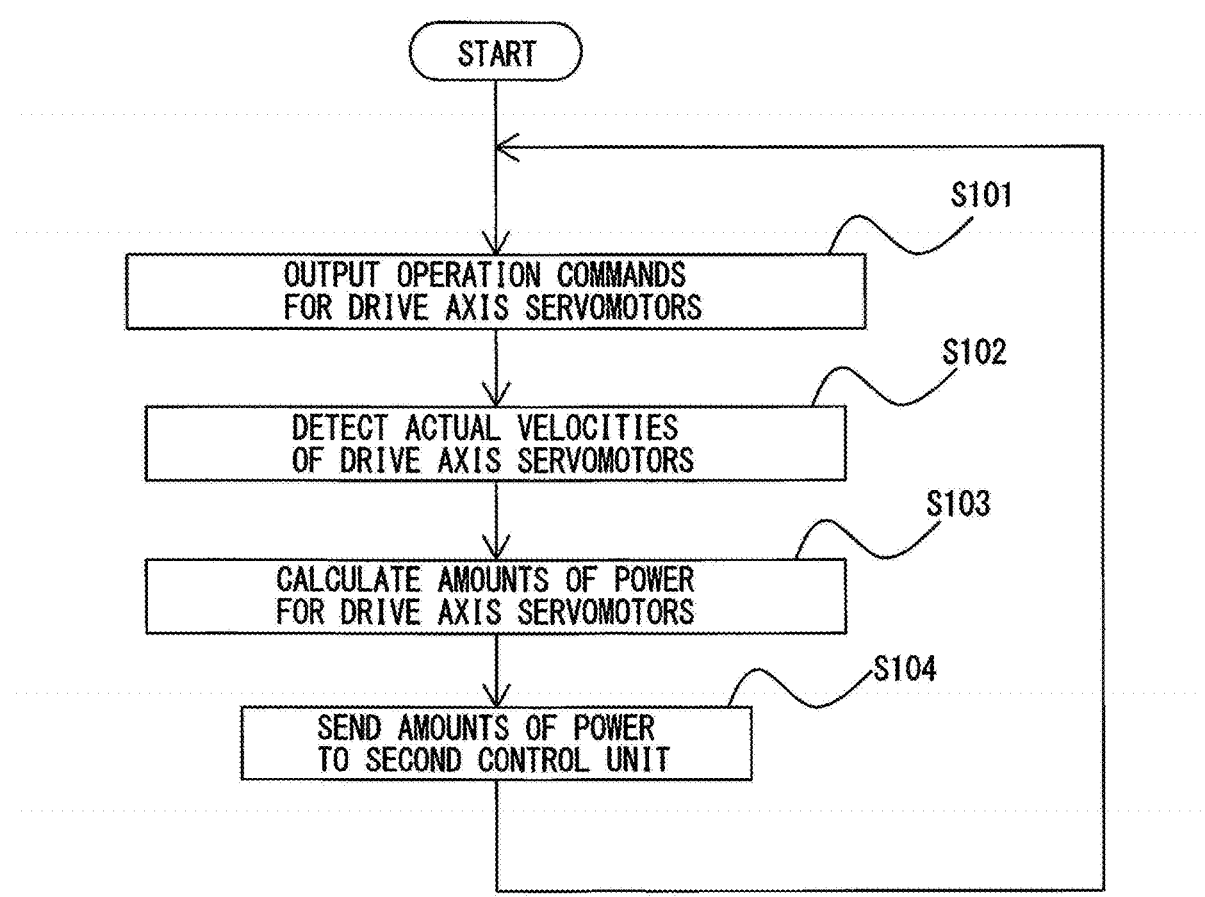
FIG. 3 is a flowchart illustrating an operation sequence associated with a first control unit in the servomotor controller according to the embodiment.
Figure 4:
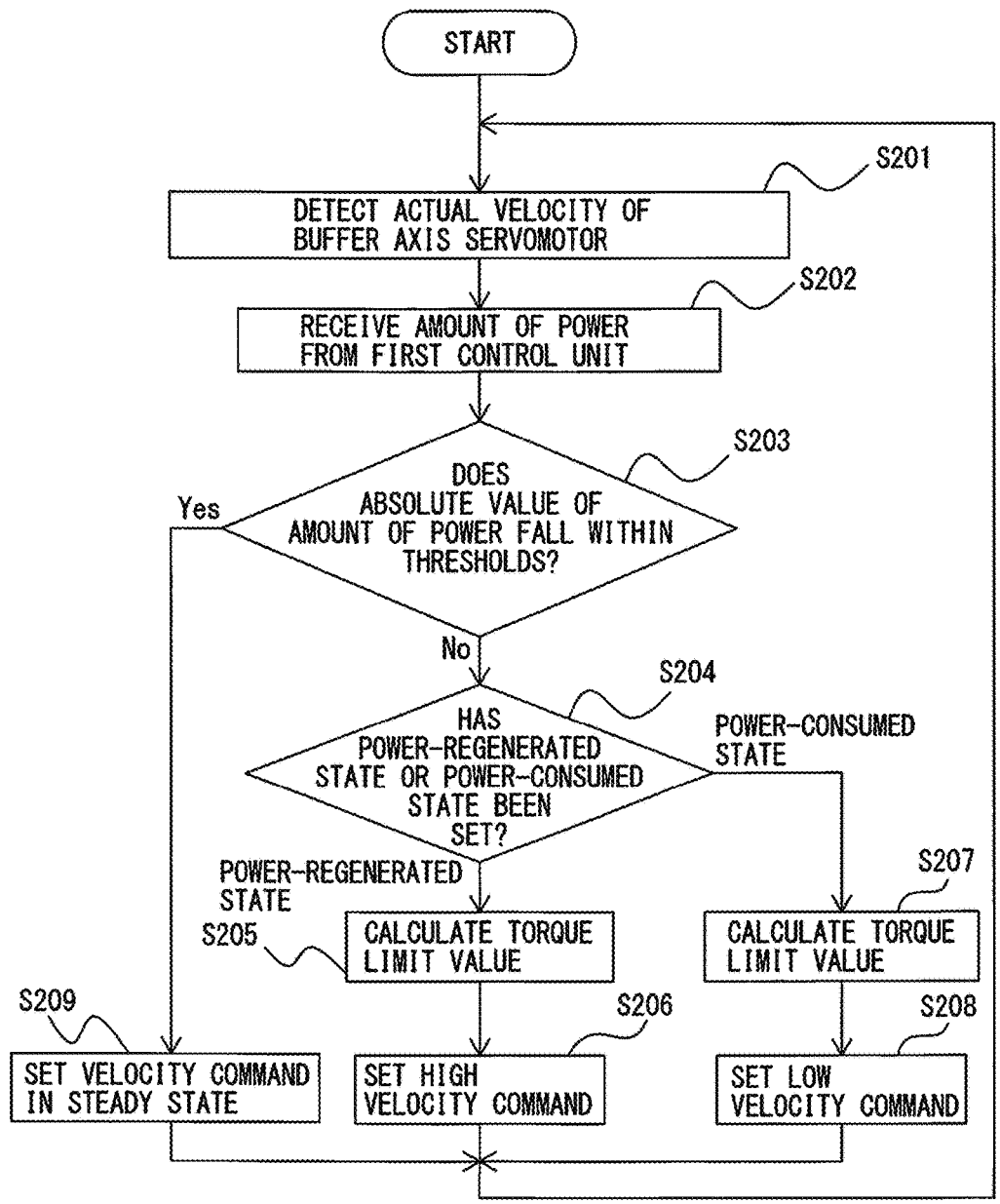
FIG. 4 is a flowchart illustrating an operation sequence associated with the second control unit in the servomotor controller according to the embodiment.

The operation of the servomotor controller according to the embodiment will be described next with reference to FIGS. 3 and 4. FIG. 3 is a flowchart illustrating an operation sequence associated with the first control unit in the servomotor controller according to the embodiment. FIG. 4 is a flowchart illustrating an operation sequence associated with the second control unit in the servomotor controller according to the embodiment.

As depicted in FIG. 3, in step S101, the first control unit 16-1 generates operation commands for controlling the velocity, torque, or rotor position of the drive axis servomotor 2A-1 (switching commands to the semiconductor switching element within the first inverter circuit 12-1), using, e.g., pieces of information, such as a predetermined velocity command, an operation program for the drive axis servomotor 2A-1, an AC current and/or an AC voltage output from the first inverter circuit 12-1, the rotor rotational speed and/or the rotor position of the drive axis servomotor 2A-1, on the basis of control software stored in the first control unit 16-1. Similarly, the first control unit 16-2 generates operation commands for controlling the velocity, torque, or rotor position of the drive axis servomotor 2A-2 (switching commands to the semiconductor switching element within the first inverter circuit 12-2), using, e.g., pieces of information, such as a predetermined velocity command, an operation program for the drive axis servomotor 2A-2, an AC current and/or an AC voltage output from the first inverter circuit 12-2, the rotor rotational speed and/or the rotor position of the drive axis servomotor 2A-2, on the basis of control software stored in the first control unit 16-2. Since the first control units 16-1 and 16-2 drive and control the drive axis servomotors 2A-1 and 2A-2 in accordance with different pieces of control software, the drive axis servomotors 2A-1 and 2A-2 respectively perform different operations on the same time axis. A method for generating operation commands by the first control units 16-1 and 16-2 does not particularly limit the present invention, and may be a known generation method such as the sine-triangle wave comparison PWM scheme.

In step S102, the actual velocities of the drive axis servomotors 2A-1 and 2A-2 are detected by a velocity detection unit (not illustrated) mounted in each of the drive axis servomotors 2A-1 and 2A-2.

In step S103, the power calculation unit 15 calculates amounts of power for the individual drive axis servomotors 2A-1 and 2A-2.

In step S104, the communication unit 19 sends the amounts of power calculated by the power calculation unit 15 to the second control unit 17.

The first control units 16-1 and 16-2 repeatedly execute the above-mentioned processes in steps S101 to S104.

The second control unit 17 generates operation commands for controlling the velocity, torque, or rotor position of the buffer axis servomotor 2B (switching commands to the semiconductor switching element within the second inverter circuit 14), using, e.g., pieces of information, such as a predetermined velocity command, an operation program for the buffer axis servomotor 2B, an AC current and/or an AC voltage output from the second inverter circuit 14, the rotor rotational speed and/or the rotor position of the buffer axis servomotor 2B, in accordance with control software stored in the second control unit 17. In step S201 of FIG. 4, the actual velocity of the buffer axis servomotor 2B is detected by a velocity detection unit (not illustrated) mounted in the buffer axis servomotor 2B.

In step S202, the second control unit 17 receives the amount of power calculated by the power calculation unit 15 via the communication unit 19. In the example illustrated in FIG. 1, since a plurality of drive axis servomotors 2A (reference numerals 2A-1 and 2A-2) are provided, the second control unit 17 calculates a sum of the amount of power of the drive axis servomotor 2A-1 and the amount of power of the drive axis servomotor 2A-2. As an alternative thereto, when a sum calculation unit (not illustrated) that calculates a sum of amounts of power for the respective drive axis servomotors 2A individually calculated by the power calculation unit 15 mounted in each of the first control units 16-1 and 16-2 is separately provided, the second control unit 17 may receive via the communication unit 19, information concerning the sum of amounts of power calculated by the sum calculation unit.

In step S203, the determination unit 21 determines whether the absolute value of the amount of power calculated by the power calculation unit 15 falls within thresholds. More specifically, the determination unit 21 determines whether the absolute value of the amount of power calculated by the power calculation unit 15 does not exceed a first threshold, and determines whether the absolute value of the amount of power calculated by the power calculation unit 15 does not exceed a second threshold.

When it is determined in step S203 that the above-mentioned absolute value falls within the thresholds (first threshold and second threshold), in step S209 the velocity command unit 22 sets the velocity command in a steady state. The process then returns to step S201.

When it is determined in step S203 that the above-mentioned absolute value falls outside the thresholds (first threshold and second threshold), the process advances to step S204.

In step S204, the determination unit 21 determines whether the drive axis servomotors 2A-1 and 2A-2 are, as a whole, in a power-regenerated state or a power-consumed state on the basis of the amount of power calculated by the power calculation unit 15.

When it is determined in step S204 that the power-regenerated state has been set, in step S205 the torque limit value calculation unit 23 calculates a torque limit value $T_{lim}$ for the torque command used in the power conversion by the second inverter circuit 14 to drive the buffer axis servomotor 2B, on the basis of the difference between the amount of power calculated by the power calculation unit 15 and the first threshold, and the actual velocity of the buffer axis servomotor 2B.

In subsequent step S206, the velocity command unit 22 sets the velocity command used in the power conversion by the second inverter circuit 14 to drive the buffer axis servomotor 2B to a value (fixed value) larger than the velocity command in a steady state.

The processes in steps S205 and S206 may be executed in reverse order.

When the absolute value of the amount of power (the sum of amounts of power when a plurality of drive axis servomotors 2A are provided) calculated by the power calculation unit 15 falls outside the thresholds and the power-regenerated state has been set, the power conversion operation of the second inverter circuit 14 is controlled on the basis of the velocity command set to a value larger than the velocity command in a steady state, and the torque limit value $T_{lim}$ calculated by the torque limit value calculation unit 23, through the above-mentioned processes in steps S203 to S206. Thus, a higher AC power is supplied from the second inverter circuit 14 to the buffer axis servomotor 2B, which then accelerates. As a result, power regenerated from each of the drive axis servomotors 2A-1 and 2A-2 is supplied to the buffer axis servomotor 2B through the AC power supply 3. After the process in step S206, the process returns to step S201.

When it is determined in step S204 that the power-consumed state has been set, in step S207 the torque limit value calculation unit 23 calculates a torque limit value $T_{lim}$ for the torque command used in the power conversion by the second inverter circuit 14 to drive the buffer axis servomotor 2B, on the basis of the difference between the amount of power calculated by the power calculation unit 15 and the second threshold, and the actual velocity of the buffer axis servomotor 2B.

In subsequent step S208, the velocity command unit 22 sets the velocity command used in the power conversion by the second inverter circuit 14 to drive the buffer axis servomotor 2B to a value (fixed value) smaller than the velocity command in a steady state.

The processes in steps S207 and S208 may be executed in reverse order.

When the absolute value of the amount of power (the sum of amounts of power when a plurality of drive axis servomotors 2A are provided) calculated by the power calculation unit 15 falls outside the thresholds and the power-consumed state has been set, the power conversion operation of the second inverter circuit 14 is controlled on the basis of the velocity command set to a value smaller than the velocity command in a steady state, and the torque limit value $T_{lim}$ calculated by the torque limit value calculation unit 23, through the above-mentioned processes in steps S203, S204, S207, and S208. Thus, the buffer axis servomotor 2B decelerates. As a result, power regenerated from the buffer axis servomotor 2B is supplied to the drive axis servomotors 2A-1 and 2A-2 through the AC power supply 3. After the process in step S208, the process returns to step S201.

After the process in any of steps S206, S208, and S209, the process returns to step S201, in which the above-mentioned processes in steps S202 to S209 are executed again. When, for example, the absolute value of the amount of power calculated by the power calculation unit 15 falls outside the thresholds and the power-regenerated state has been set, the buffer axis servomotor 2B accelerates upon control of the power conversion operation of the second inverter circuit 14, based on the velocity command set to a value larger than the velocity command in a steady state, and the torque limit value $T_{lim}$ calculated by the torque limit value calculation unit 23, but thereafter, when it is determined in step S203 that the absolute value of the amount of power calculated by the power calculation unit 15 falls within the thresholds, in step S209 a return is made to the velocity command in a steady state by the velocity command unit 22. Further, when, for example, the absolute value of the amount of power calculated by the power calculation unit 15 falls within the thresholds, the power conversion operation of the second inverter circuit 14 is controlled in accordance with the velocity command in a steady state to drive the buffer axis servomotor 2B, but thereafter, when it is determined in step S203 that the absolute value of the amount of power calculated by the power calculation unit 15 falls outside the thresholds, the buffer axis servomotor 2B accelerates or decelerates upon control of the power conversion operation of the second inverter circuit 14, based on the velocity command set to a value larger or smaller than the velocity command in a steady state, and the torque limit value $T_{lim}$ calculated by the torque limit value calculation unit 23.

Figure 5:
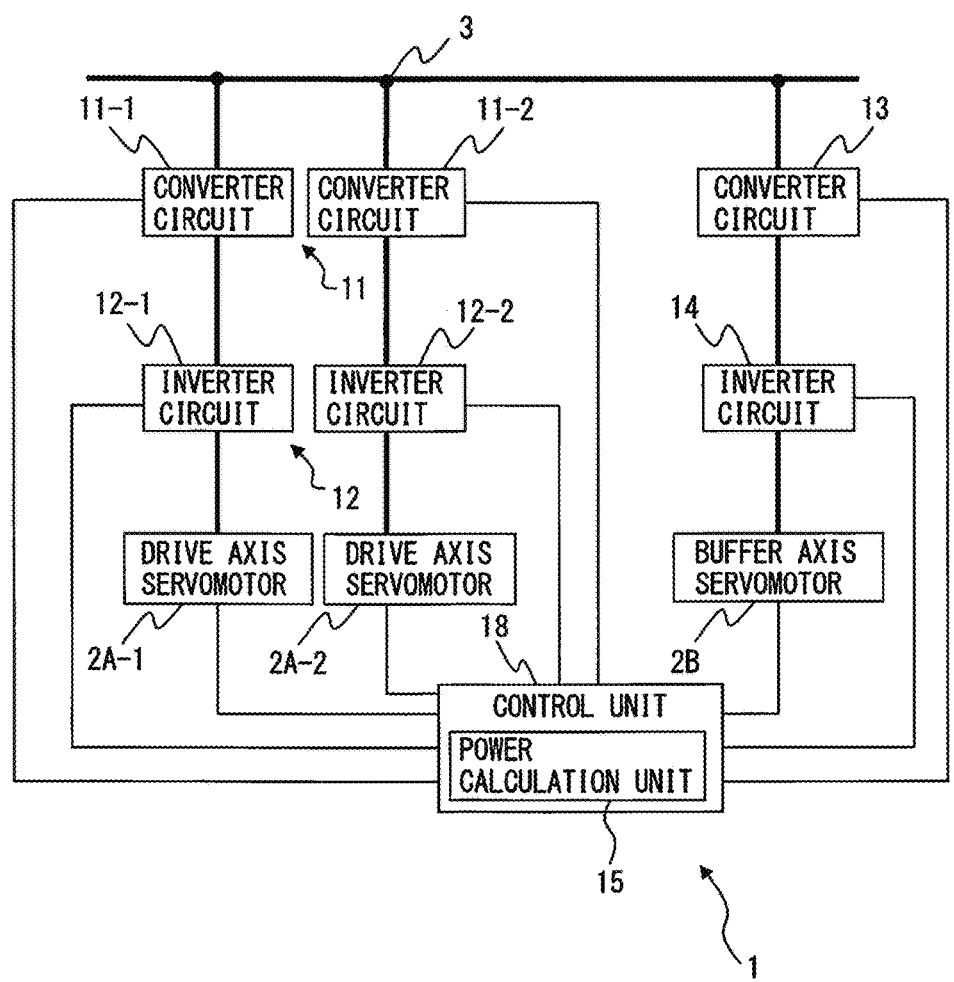
FIG. 5 is a block diagram illustrating a modification of the servomotor controller according to the embodiment.

In the above-described embodiment, first control units 16-1 and 16-2 that control power conversion by the first converter circuits 11-1 and 11-2 and the first inverter circuits 12-1 and 12-2, and a second control unit 17 that controls power conversion by the second converter circuit 13 and the second inverter circuit 14 are provided independently of each other, but as a modification thereto, the same control unit may execute the functions of the first control units 16-1 and 16-2 and the second control unit 17. FIG. 5 is a block diagram illustrating a modification of the servomotor controller according to the embodiment. A control unit 18 includes a power calculation unit 15 and controls power conversion by the first converter circuits 11-1 and 11-2, the first inverter circuits 12-1 and 12-2, the second converter circuit 13, and the second inverter circuit 14. Since circuit components other than the control unit 18 are the same as those illustrated in FIGS. 1 and 2, the same reference numerals denote the same circuit components, and a detailed description thereof will not be given. The operation sequence of the servomotor controller 1 according to the modification illustrated in FIG. 5 is basically the same as that described with reference to FIGS. 3 and 4, but is different from the latter in terms of not executing the process of transmitting and receiving information concerning the amount of power from the first control unit to the second control unit (step S104 in FIG. 3 and step S202 in FIG. 4).

As described above, with the servomotor controller according to the present invention, since power is exchanged not through a DC link but through an AC power supply, the numbers of buffer axis servomotors and converter circuits and inverter circuits for buffer axes can be reduced to implement a compact, low-cost servomotor controller that can reduce the power peak.

Figure 7:
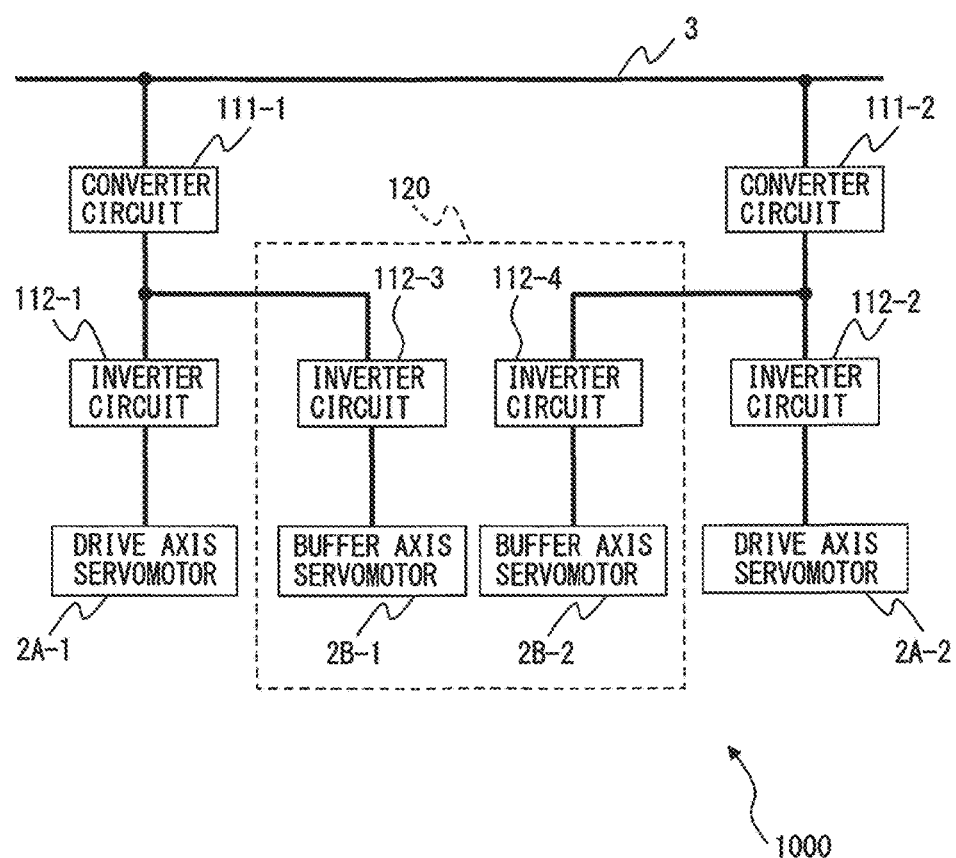
FIG. 7 is a block diagram illustrating an exemplary conventional servomotor controller including buffer axis servomotors of a single-winding type as an energy storage device to reduce the power peak.

For example, in comparing the servomotor controller according to the embodiment illustrated in FIG. 1 and the conventional servomotor controller illustrated in FIG. 7, two drive axis servomotors (reference numerals 2A-1 and 2A-2) are used in each of them and one buffer axis servomotor of a single-winding type (reference numeral 2B) is used in each of them, but according to the present invention, since power is exchanged not through a DC link but through the AC power supply 3, a plurality of pairs of buffer axis servomotors and inverter circuits therefor may not be provided even when a plurality of drive axis servomotors are used, thus implementing a compact, low-cost servomotor controller.

Figure 6:
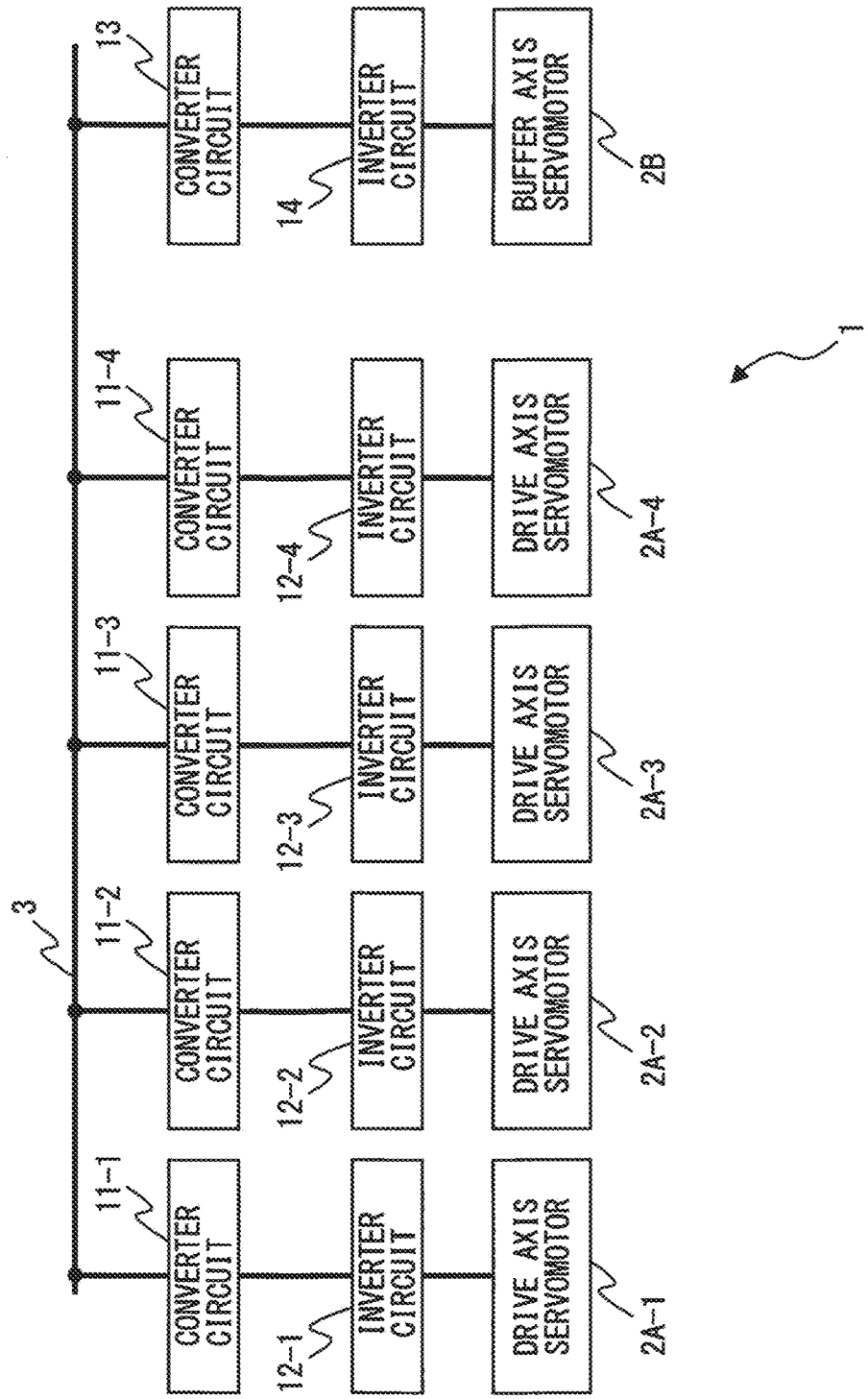
FIG. 6 is a block diagram for explaining the effect obtained using the servomotor controller according to the embodiment to drive a plurality of axes.
Figure 8:
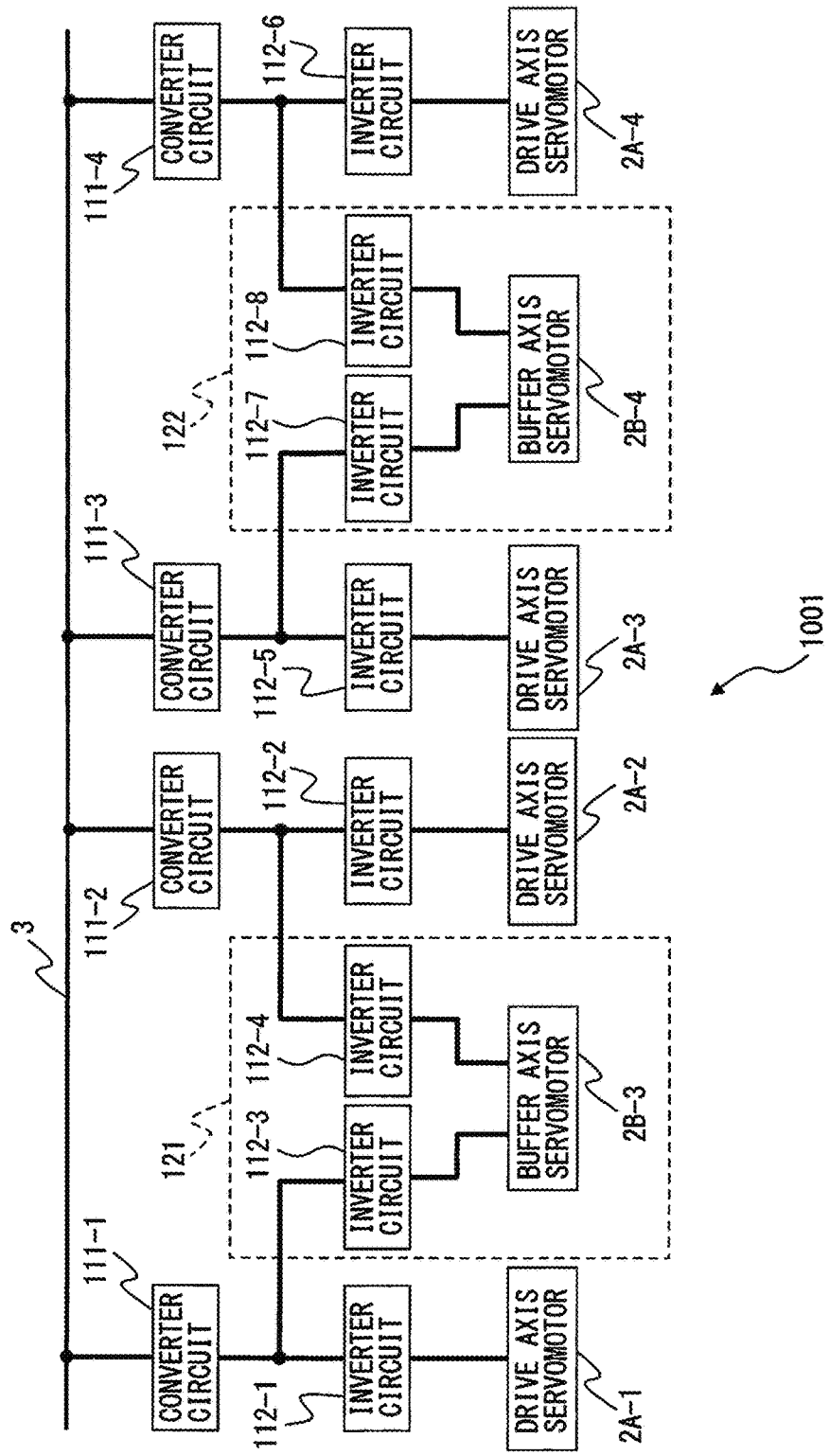
FIG. 8 is a block diagram illustrating an exemplary conventional servomotor controller for driving a plurality of axes, including buffer axis servomotors of a plural-winding type as an energy storage device to reduce the power peak.

In addition, for example, even a servomotor controller for driving a plurality of axes can be implemented as a compact, low-cost servomotor controller that can reduce the power peak, in accordance with the present invention. FIG. 6 is a block diagram for explaining the effect obtained using the servomotor controller according to the embodiment to drive a plurality of axes. As in FIG. 8 that illustrates a conventional servomotor controller for driving a plurality of axes, FIG. 6 assumes that the drive axis servomotors 2A-1 and 2A-2 are used to drive a first drive axis (not illustrated), and the drive axis servomotors 2A-3 and 2A-4 are used to drive a second drive axis (not illustrated), independently of the first drive axis. Note that a control unit is not illustrated in FIG. 6. The drive axis servomotors 2A-1, 2A-2, 2A-3, and 2A-4 are provided with a pair of a converter circuit 11-1 and an inverter circuit 12-1, a pair of a converter circuit 11-2 and an inverter circuit 12-2, a pair of a converter circuit 11-3 and an inverter circuit 12-3, and a pair of a converter circuit 11-4 and an inverter circuit 12-4, respectively, as illustrated in FIG. 6. According to the present invention, since power is exchanged not through a DC link but through the AC power supply 3, even when a plurality of drive axis servomotors are provided to drive a plurality of axes, it suffices to provide only one buffer axis servomotor 2B and only one pair of a converter circuit 13 and an inverter circuit 14 therefor, so that the numbers of buffer axis servomotors and converter circuits and inverter circuits for buffer axes can be made smaller than those in the conventional example illustrated in FIG. 8. It further suffices to implement a buffer axis servomotor 2B as a single-winding type, thus keeping the cost low. Hence, the present invention can implement a compact, low-cost servomotor controller.

An industrial machine that employs the servomotor according to the present invention may include, e.g., a plurality of mechanisms implemented in a plurality of press machine sliding mechanisms or press machine die cushion mechanisms, and each of these mechanisms includes at least one servomotor.

According to the present invention, a servomotor controller for controlling a servomotor that uses as drive power, AC power obtained by converting AC power on the side of an AC power supply into DC power and further converting the DC power into AC power can be implemented as a compact, low-cost servomotor controller that can reduce the power peak.

According to the present invention, since power is exchanged not through a DC link but through an AC power supply, the numbers of buffer axis servomotors and converter circuits and inverter circuits for buffer axes can be reduced to, in turn, reduce the power peak without involving a higher cost and larger device.

What is claimed is:

1. A servomotor controller comprising:
    at least one first converter circuit that performs power conversion between AC power on a side of an AC power supply and DC power on a DC side;
    at least one first inverter circuit that performs power conversion between the DC power on the DC side of the first converter circuit and one of AC power supplied to a first servomotor and AC power regenerated from the first servomotor;
    at least one second converter circuit that performs power conversion between the AC power on the side of the AC power supply and DC power on a DC side;
    at least one second inverter circuit that performs power conversion between the DC power on the DC side of the second converter circuit and one of AC power supplied to a second servomotor and AC power regenerated from the second servomotor; and
    a power calculation unit that calculates an amount of power consumed or regenerated in the first servomotor,
    wherein the power conversion by the second converter circuit and the second inverter circuit is controlled so that the power regenerated from the first servomotor is supplied to the second servomotor through the AC power supply or the power regenerated from the second servomotor is supplied to the first servomotor through the AC power supply, on the basis of the amount of power calculated by the power calculation unit.

2. The servomotor controller according to claim 1, further comprising: a control unit that controls the power conversion by the first converter circuit, the first inverter circuit, the second converter circuit, and the second inverter circuit and that comprises the power calculation unit.

3. The servomotor controller according to claim 1, further comprising:
    a first control unit that controls the power conversion by the first converter circuit and the first inverter circuit and that comprises the power calculation unit;
    a second control unit that is provided independently of the first control unit and controls the power conversion by the second converter circuit and the second inverter circuit; and
    a communication unit that sends the amount of power calculated by the power calculation unit to the second control unit,
    wherein the second control unit controls the power conversion by the second converter circuit and the second inverter circuit, on the basis of the amount of power calculated by the power calculation unit and received via the communication unit.

4. The servomotor controller according to claim 1, wherein the power conversion by the second converter circuit and the second inverter circuit is controlled on the basis of a sum of amounts of power calculated respectively for a plurality of first servomotors by the power calculation unit.

5. The servomotor controller according to claim 1, wherein the power calculation unit calculates an amount of power consumed or regenerated in the first servomotor, on the basis of an actual velocity of the first servomotor and a torque command used in the power conversion by the first inverter circuit to drive the first servomotor.

6. The servomotor controller according to claim 1, wherein the power conversion by the second converter circuit and the second inverter circuit is controlled on the basis of a difference between the amount of power calculated by the power calculation unit and predetermined thresholds.

7. The servomotor controller according to claim 6, further comprising:
    a determination unit that determines whether the first servomotor is in a power-regenerated state or a power-consumed state on the basis of the amount of power calculated by the power calculation unit and that determines whether an absolute value of the amount of power calculated by the power calculation unit falls within the predetermined thresholds;
    a velocity command unit that sets a velocity command used in the power conversion by the second inverter circuit to drive the second servomotor to a value larger than a velocity command in a steady state when it is determined by the determination unit that the power-regenerated state has been set and that the absolute value of the amount of power calculated by the power calculation unit has exceeded a first threshold of the predetermined thresholds, and that sets a velocity command used in the power conversion by the second inverter circuit to drive the second servomotor to a value smaller than a velocity command in a steady state when it is determined by the determination unit that the power-consumed state has been set and that the absolute value of the amount of power calculated by the power calculation unit has exceeded a second threshold of the predetermined thresholds; and
    a torque limit value calculation unit that calculates a torque limit value for a torque command used in the power conversion by the second inverter circuit to drive the second servomotor, on the basis of the difference between the amount of power calculated by the power calculation unit and the predetermined thresholds, and the actual velocity of the first servomotor,
    wherein the power conversion by the second inverter circuit is controlled on the basis of the torque limit value calculated by the torque limit value calculation unit and the velocity command set by the velocity command unit.

* * * * *